G. L. KLINE.
DEVICE FOR SPLICING FILMS.
APPLICATION FILED JUNE 11, 1909.

1,007,034.

Patented Oct. 24, 1911.
2 SHEETS—SHEET 1.

Attest.
H. G. Fletcher.
E. R. Wallace.

Inventor.
George L. Kline.
By Higdon & Longan
attys.

G. L. KLINE.
DEVICE FOR SPLICING FILMS.
APPLICATION FILED JUNE 11, 1909.
1,007,034.
Patented Oct. 24, 1911.
2 SHEETS—SHEET 2.
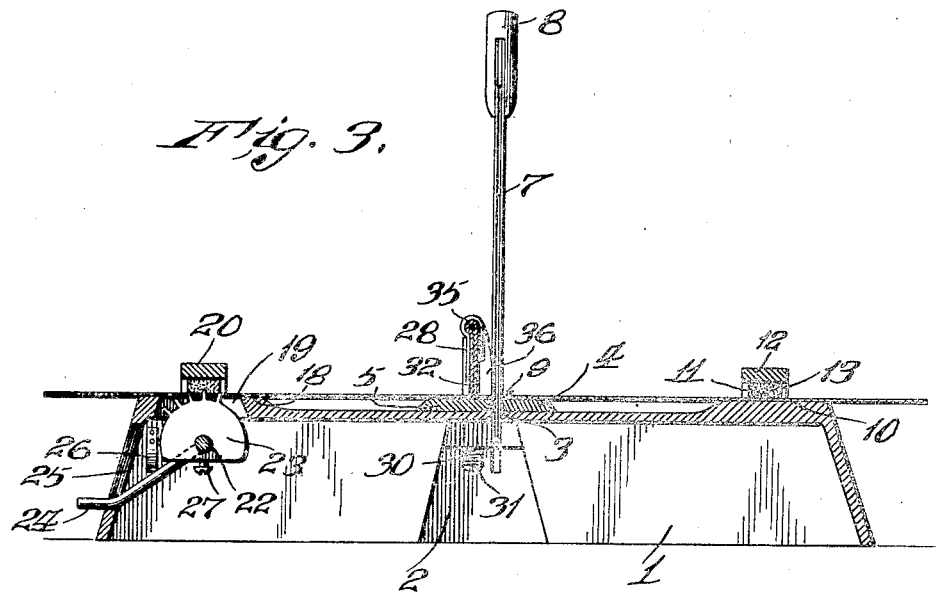
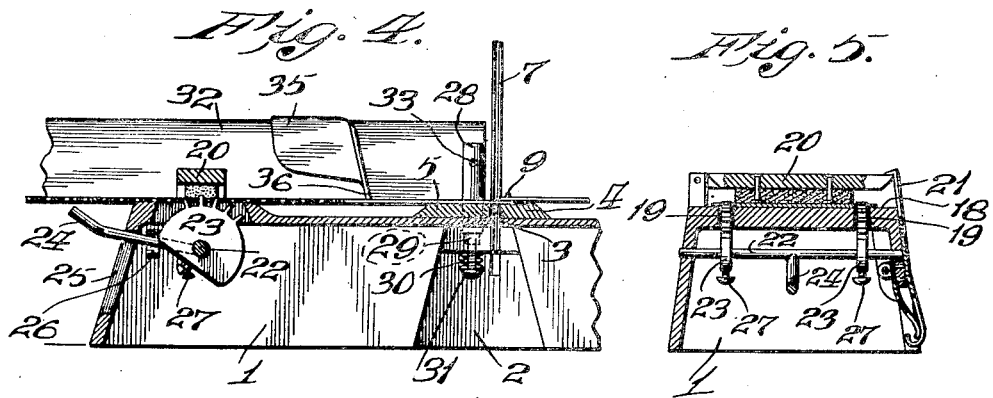
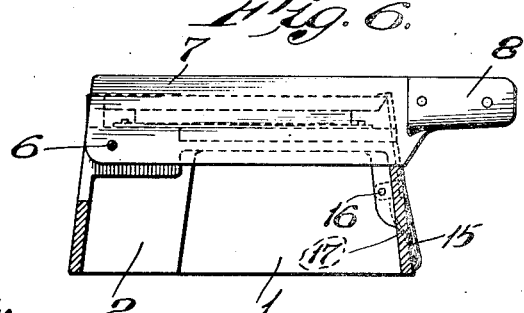
attest.
H. G. Fletcher.
E. L. Wallace.
Inventor.
George L. Kline.
By Higdon & Longan
attys.

UNITED STATES PATENT OFFICE.

GEORGE L. KLINE, OF ST. LOUIS, MISSOURI.

DEVICE FOR SPLICING FILMS.

1,007,034.   Specification of Letters Patent.   Patented Oct. 24, 1911.

Application filed June 11, 1909. Serial No. 501,540.

*To all whom it may concern:*

Be it known that I, GEORGE L. KLINE, a citizen of the United States, and resident of St. Louis, Missouri, have invented certain new and useful Improvements in Devices for Splicing Films, of which the following is a specification containing a full, clear, and exact description, reference being had to the accompanying drawings, forming a part hereof.

My invention relates to improvements in the art of splicing moving picture films, the object of my invention being to construct a device for splicing films which will cut each broken or mutilated end of film at a point, either on the line dividing the individual pictures on the film or between such lines to remove a portion of the sensitized gelatin on one end of the film and hold the severed ends in matching positions to be united.

Figure 1:
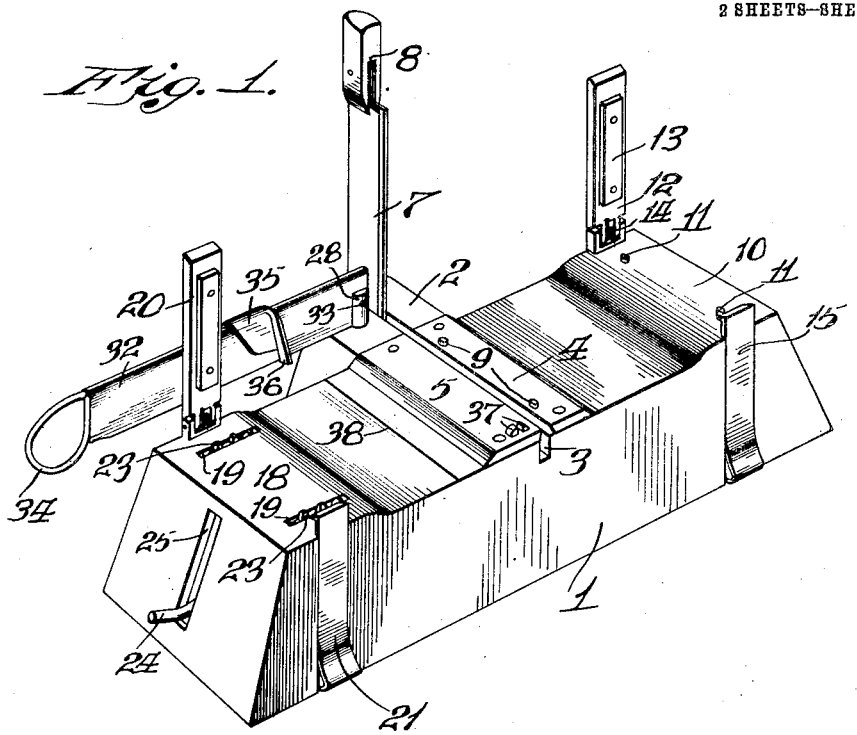
Figure 2:
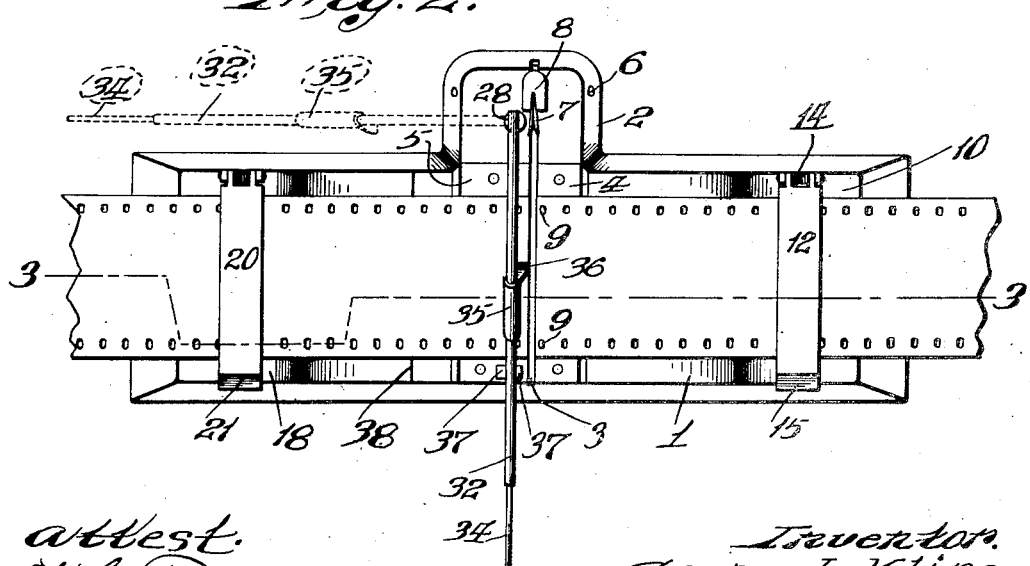

For the above purposes my invention consists in certain novel features of the construction and arrangement of parts as will be hereinafter more fully set forth, pointed out in my claims and illustrated by the accompanying drawings, in which:

Figure 1 is a perspective of the complete device; Fig. 2 is a plan of the device showing a film in position thereon, after each of its ends have been severed and the plane in position to remove a portion of the sensitized gelatin; Fig. 3 is a vertical sectional elevation taken on the line 3—3 of Fig. 2; Fig. 4 is a view similar to Fig. 3 showing a portion of the right hand end of the device broken away and the gelatin plane guide thrown out of operative position and the left hand section of film moved up under the end of the right hand section of film in position to be united therewith; Fig. 5 is a transverse sectional elevation illustrating the means for securing the left hand section of film thereto, the operation of cutting its broken or mutilated end and the means for moving the film after being cut to place it in position to be united with the right hand section of film; and, Fig. 6 is a transverse sectional elevation showing the position of the cutting blades after a cut has been made.

Referring by numerals to the accompanying drawings: 1 designates the base section, preferably made of a single hollow casting. Projecting laterally from the rear wall of the base is an integral hollow extension 2, the upper face of which extension is in a plane somewhat higher than the plane of the base section proper. A slot 3 is formed through the base section and lateral extension 2 and plates 4 and 5 are fixed to the upper face of the base section adjacent the margins of the slot 3. Extended through the walls of the extension 2 is a pivot 6, upon which is mounted a double bladed knife 7, having a handle 8 at its free end.

The plates 4 and 5 are of a thickness to allow their upper faces to flush with the upper face of the extension 2. The plate 4 is provided with integral bosses 9 projecting a slight distance above the upper face of the plate, and of a size corresponding to the perforations in the films.

The upper face of the base, adjacent the right hand end, is on a horizontal plane parallel with the plates 4 and 5 and arranged midway of such face are the bosses 11 arranged in such position relative to the bosses 9 that they will engage in perforations in the film when the film is taut.

A clamping member 12, having a padded surface 13, is hinged to the base section and arranged to be normally spring-held vertically by the spring 14. A latch 15 is arranged on the forward wall of the base section in such position that it will engage the member 12 as required to secure a film between the padded section 13 and face 10. The latch 15 is supported on a pivot 16 arranged on the inner face of the base, the wall of the base being slotted to permit movement of the lower end of the latch. A leaf spring 17 is fixed to the inner wall of the base section and normally tends to hold the latch in position to hold the hinge member 12. The opposite end of the base 1 is provided with a face 18 on the same horizontal plane as the surface 10 and the plates 4 and 5; this surface is provided with slots 19 alining with the bosses 9 and 11, and a padded hinge member 20, similar to the member 12, is pivoted adjacent the rear wall of the base; and a latch 21, similar to the latch 15, is arranged to secure the hinge member 20.

Extending transversely of the machine beneath the surface 18, at the left hand end of the device, is a shaft 22 mounted in the side walls of the base arranged to support segmental racks 23, the teeth of which racks project upwardly through the slots 19 and project slightly above the surface 18.

A lever 24 is carried by the shaft 22 and projects through a slot 25 in the left hand wall of the base. A leaf spring 26 secured to the inside wall of the base is arranged to normally hold the lever 24 downwardly.

The segments 23 are arranged for adjustment relative to the shaft 22 by means of the set screws 27. An upright 28 having a reduced lower end portion 29, extended through the upper wall of the lateral extension 2 and held in place by the expansive coil spring 30 and set screw 31 is arranged for rotary and vertical movement relative to the wall of the lateral extension 2. A plane guide 32 is hinged to the upright 28 by means of the pivot 33 and has a handle 34 at its free end. A plane 35 having a cutting edge 36 is arranged to slide over the guide 32.

Bosses 37 are arranged on the plate 5 adjacent the forward margin thereof to provide a means for holding the outer end of the plane guide when the same is in position to remove a portion of the sensitized gelatin from the film.

On the upper face of the base section, adjacent the left hand margin of the plate 5, is an indicating line 38, which line indicates to the operator a necessary positioning of the left hand end of film to cut the same to match the cut of the right hand end of film.

When it is desired to repair a broken or mutilated film, the operator positions the right hand section of film on the right hand end of the device, placing the film over the bosses 9 and 11 so that a film line is positioned immediately over the cutting margin of the plate 4, the hinge member 12 is then moved downwardly and held by the latch 15 to securely clamp this section of film to the base. The knife 7 is then moved downwardly and the right hand blade thereof co-acting with the plate 4 cuts the film on a film line. The operator then places the left hand end of the film on the left hand end of the base with a line of film immediately over the designating mark 38, the teeth of the segmental racks 23 engaging the perforations in the film, the designating mark on the base being in such position relative to the cutting margin of the plate 5 that the film will be cut a distance away from the film line equal to the width of the plane. The hinge member 20 is then placed over the film and secured by the latch 21, the knife 7 is then drawn downwardly so that its left hand cutting blade will co-act with the cutting plate 5 to sever the broken or mutilated end of the left hand section of film. The plane guide is then swung to a position over the plate 5 and inserted between the bosses 37. The sensitized gelatin on the film, to the right of the plane guide, is then moistened by any suitable means and the plane and its cutting edge is then moved to remove such moistened portion of the film, the moistening being a common expedient in the art. An adhesive substance is then applied to the film, the plane guide preventing such adhesive material from flowing over the portion of film on the left hand side of the guide. After the adhesive material is applied to the celluloid film the plane and its guide are thrown out of operative position. The operator then moves the lever 24, which movement, through the segmental racks engaging the perforations in the film, moves the left hand section of film a distance equal to the width of the plane, the padded section of the hinge member 20 permitting such movement without releasing the hinge member. The right hand section of film is then disengaged from the bosses 9 and the end of the left hand section is then placed on said bosses, the right hand section being then placed over the end of the left hand section, the bosses 9 passing through perforations in each end of each film section. The ends of the films are then held manually a sufficient time to permit a perfect adhesion of the two parts.

Heretofore splicing of films has been done solely by hand, the cutting operation being accomplished by ordinary scissors or shears, which operation did not assure a perfect matching of pictures on the films and consumed considerably more time than is consumed by the operation of cutting with applicant's device. The removing of the sensitized material heretofore has been done solely by hand with no positive means for selecting a line on the film to be removed. By the use of the bosses 9 and 11 perfect matching or mating of the perforations in the film is assured. Heretofore this matching and mating was done solely by the guidance of the operator's eyes which did not assure perfect matching of perforations.

I claim:

1. In a device of the class described, film securing members, film cutting members, means for moving a section of film, means for indicating the lines of cuts and means for removing a section of sensitized gelatin from a film section.

2. In a device of the class described, film securing members, film cutting members, means for moving a section of film, means for indicating the lines of cuts, means for removing a section of sensitized gelatin from a film section and means for registering the cut ends of film to be united.

3. In a device of the class described, film securing members, film cutting members, means for moving a section of film, means for indicating the lines of cuts, means for removing a section of sensitized gelatin from a film section and bosses arranged to be engaged by the perforations in the film sections for registering the cut ends of film to be united.

4. In a device of the class described, hinged securing members, fixed cutting members, a hinged knife, segments engaging the perforations in a film section arranged to move such section, means for indicating the lines of cuts, a plane for removing a section of sensitized gelatin from a film section and bosses to be engaged by perforations in the film sections for registering such sections to be united.

5. In a device of the class described, a base, fixed cutting members secured to the base, movable cutting members arranged to operate between the fixed cutting members, a film-holding device on each side of the cutting members, means for removing a section of the sensitized gelatin from one of the sections of the film after it is cut and means for moving the section of film from which the gelatin was removed a distance corresponding to the width of the surface from which the gelatin was removed.

6. A device of the character described, comprising a box structure having a top, a transverse slot extending into the sides of the box, means for clamping a film upon the box, means rotatably carried thereunder for moving the film to the desired position relative to the transverse slot, a knife pivotally carried by the box and disposed for pivotal movement within said transverse slot to sever the film and additional means for holding the ends of the severed film and another section of film.

In testimony whereof, I have signed my name to this specification, in presence of two subscribing witnesses.

GEORGE L. KLINE.

Witnesses:
E. E. LONGAN,
E. L. WALLACE.